(12) United States Patent
Tatsuno et al.

(10) Patent No.: US 9,046,674 B2
(45) Date of Patent: Jun. 2, 2015

(54) MAGNIFICATION OPTICAL SYSTEM

(71) Applicants: Hibiki Tatsuno, Kawasaki (JP);
Kiichiro Nishina, Yokohama (JP);
Yasuyuki Shibayama, Ebina (JP);
Takanobu Osaka, Yokohama (JP);
Makoto Hirakawa, Hiratsuka (JP)

(72) Inventors: Hibiki Tatsuno, Kawasaki (JP);
Kiichiro Nishina, Yokohama (JP);
Yasuyuki Shibayama, Ebina (JP);
Takanobu Osaka, Yokohama (JP);
Makoto Hirakawa, Hiratsuka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/534,863

(22) Filed: Nov. 6, 2014

(65) Prior Publication Data
US 2015/0062696 A1 Mar. 5, 2015

Related U.S. Application Data

(63) Continuation of application No. 13/669,079, filed on Nov. 5, 2012, now Pat. No. 8,922,883.

(51) Int. Cl.
| | |
|---|---|
| *G02B 17/00* | (2006.01) |
| *G02B 17/08* | (2006.01) |
| *G02B 13/16* | (2006.01) |
| *G02B 7/10* | (2006.01) |
| *G03B 21/14* | (2006.01) |

(52) U.S. Cl.
CPC ............... *G02B 17/08* (2013.01); *G02B 13/16* (2013.01); *G02B 7/10* (2013.01); *G03B 21/147* (2013.01)

(58) Field of Classification Search
USPC ........................................................ 359/364
See application file for complete search history.

(56) References Cited

U.S. PATENT DOCUMENTS

| | | |
|---|---|---|
| 2003/0222980 A1 | 12/2003 | Miyagaki et al. |
| 2004/0156117 A1 | 8/2004 | Takaura et al. |
| 2004/0184160 A1 | 9/2004 | Nishina et al. |
| 2005/0111072 A1 | 5/2005 | Miyagaki et al. |
| 2005/0185288 A1 | 8/2005 | Nishina et al. |
| 2005/0195492 A1 | 9/2005 | Nishina et al. |
| 2005/0195493 A1 | 9/2005 | Nishina et al. |
| 2006/0039068 A1 | 2/2006 | Tokita et al. |
| 2006/0126032 A1 | 6/2006 | Takaura et al. |
| 2006/0192903 A1 | 8/2006 | Takaura et al. |
| 2007/0008495 A1 | 1/2007 | Miyagaki et al. |

(Continued)

FOREIGN PATENT DOCUMENTS

| | | |
|---|---|---|
| JP | 61-292112 A | 12/1986 |
| JP | 2001-166380 A | 6/2001 |

(Continued)

OTHER PUBLICATIONS

Office Action issued in Japanese Patent Application No. 2011-242679 on Jul. 15, 2014.

*Primary Examiner* — James Jones
(74) *Attorney, Agent, or Firm* — Oblon, McClelland, Maier & Neustadt, L.L.P.

(57) ABSTRACT

A magnification optical system forms an enlarged image of an object. It includes a refractive optical system including a plurality of lens groups; and a mirror train including a curved mirror, arranged in this order from an object side, a first focus structure configured to move the respective lens groups of the refractive optical system by different amounts along a normal line of a conjugate surface on the object side, and a second focus structure configured to move the respective lens groups along the normal line of the conjugate surface on the object side by different amounts from those of the first focus structure.

8 Claims, 18 Drawing Sheets

(56) References Cited

U.S. PATENT DOCUMENTS

| | | |
|---|---|---|
| 2007/0268541 A1 | 11/2007 | Fujita et al. |
| 2008/0068563 A1 | 3/2008 | Abe et al. |
| 2008/0068564 A1 | 3/2008 | Abe et al. |
| 2008/0094718 A1 | 4/2008 | Osaka et al. |
| 2008/0151356 A1 | 6/2008 | Fujita et al. |
| 2008/0304019 A1 | 12/2008 | Takaura et al. |
| 2009/0015801 A1 | 1/2009 | Takaura et al. |
| 2009/0015910 A1 | 1/2009 | Takaura et al. |
| 2009/0021703 A1 | 1/2009 | Takaura et al. |
| 2009/0213470 A1 | 8/2009 | Abe et al. |
| 2010/0039625 A1 | 2/2010 | Takaura et al. |
| 2010/0053737 A1 | 3/2010 | Fujita et al. |
| 2010/0157421 A1 | 6/2010 | Abe et al. |
| 2010/0195061 A1* | 8/2010 | Takaura et al. ............... 353/81 |
| 2011/0038039 A1 | 2/2011 | Takaura et al. |
| 2012/0019791 A1 | 1/2012 | Abe et al. |
| 2012/0092628 A1 | 4/2012 | Takahashi et al. |
| 2012/0154768 A1 | 6/2012 | Tatsuno |
| 2012/0162753 A1 | 6/2012 | Tatsuno |

FOREIGN PATENT DOCUMENTS

| | | |
|---|---|---|
| JP | 2003-202479 A | 7/2003 |
| JP | 2004-258620 | 9/2004 |
| JP | 2005-128370 A | 5/2005 |
| JP | 2005-283638 A | 10/2005 |
| JP | 2006-018247 A | 1/2006 |
| JP | 2007-163653 A | 6/2007 |
| JP | 2007-212748 | 8/2007 |
| JP | 2007-316674 | 12/2007 |
| JP | 2008-096983 | 4/2008 |
| JP | 2008-096984 | 4/2008 |
| JP | 2008-158495 A | 7/2008 |
| JP | 2008-165187 | 7/2008 |
| JP | 2008-165202 | 7/2008 |
| JP | 2008-181152 | 8/2008 |
| JP | 2008-268978 | 11/2008 |
| JP | 2009-008931 | 1/2009 |
| JP | 2009-080462 | 4/2009 |
| JP | 2009-086315 | 4/2009 |
| JP | 2009-199020 A | 9/2009 |
| JP | 2009-204846 | 9/2009 |
| JP | 2009-222806 | 10/2009 |
| JP | 2009-229738 | 10/2009 |
| JP | 2009-251457 | 10/2009 |
| JP | 2010-020344 | 1/2010 |
| JP | 2010-044430 | 2/2010 |
| JP | 2010-085973 | 4/2010 |
| JP | 2010-197495 | 9/2010 |
| JP | 2010-197837 | 9/2010 |
| JP | 2010-197874 | 9/2010 |
| JP | 2010-204486 | 9/2010 |
| JP | 2011-059459 | 3/2011 |
| JP | 2011-100008 | 5/2011 |
| JP | 2011-107295 | 6/2011 |
| JP | 2011-112811 | 6/2011 |
| JP | 2011-112862 | 6/2011 |
| JP | 2011-112864 | 6/2011 |
| JP | 2011-150355 | 8/2011 |
| JP | 2011-164140 | 8/2011 |
| JP | 2011-175092 | 9/2011 |
| JP | 2011-180384 | 9/2011 |
| JP | 2011-232416 | 11/2011 |
| JP | 2011-242606 | 12/2011 |
| JP | 2012-008284 | 1/2012 |
| JP | 2012-027113 | 2/2012 |
| JP | 2012-083671 | 4/2012 |
| JP | 2012-118124 | 6/2012 |
| JP | 2012-124547 | 6/2012 |
| JP | 2012-155203 | 8/2012 |
| JP | 2012-163732 | 8/2012 |
| JP | 2012-168482 | 9/2012 |
| WO | WO 2011/145535 A1 | 11/2011 |

* cited by examiner

FIG. 13

| SURFACE NUMBER | CURVATURE RADIUS | INTERVAL (mm) | REFRACTIVE INDEX (D LINE) | ABBE NUMBER | APERTURE RADIUS | ECCENTRICITY Y (mm) | ECCENTRICITY α (mm) | ASPHERICAL SURFACE |
|---|---|---|---|---|---|---|---|---|
| LV(0) | 1.0E+18 | 1.110 | | | | | 0 | |
| 1 | 1.0E+18 | 1.050 | 1.516798 | 64.10 | | 0 | 0 | |
| 2 | 1.0E+18 | 42.000 | | | | 0 | 0 | |
| 3 | 1.0E+18 | 0.000 | | | | 0 | 0 | |
| 4 | 19.8665 | 4.340 | 1.517600 | 63.5 | | -1.580 | 0 | * |
| 5 | -194.3914 | 1.001 | | | | -1.580 | 0 | * |
| 6 | 62.7538 | 0.900 | 1.883000 | 40.80 | | -1.580 | 0 | |
| 7 | 12.5448 | 5.004 | 1.487489 | 70.44 | | -1.580 | 0 | |
| 8 | -20.0153 | 0.100 | | | | -1.580 | 0 | |
| APERTURE | -47.7552 | 5.158 | 1.732231 | 38.16 | 7.5 | -1.580 | 0 | |
| 10 | 70.4272 | 0.105 | | | | -1.580 | 0 | |
| 11 | 19.2750 | 7.246 | 1.581893 | 40.80 | | -1.580 | 0 | |
| 12 | -16.2466 | 5.647 | 1.904000 | 31.30 | | -1.580 | 0 | |
| 13 | -31.1718 | 6.765 | | | | -1.580 | 0 | |
| 14 | 1.0E+18 | 0.000 | | | | -1.580 | 0 | |
| 15 | -140.6599 | 1.559 | 1.502194 | 68.83 | | -1.580 | 0 | |
| 16 | 24.9213 | 0.468 | | | | -1.580 | 0 | |
| 17 | 17.8966 | 5.384 | 1.706797 | 29.84 | | -1.580 | 0 | |
| 18 | -44.9654 | 1.689 | | | | -1.580 | 0 | |
| 19 | -25.2337 | 1.900 | 1.904000 | 31.30 | | -1.580 | 0 | |
| 20 | 18.4834 | 4.097 | | | | -1.580 | 0 | |
| 21 | -16.4236 | 1.555 | 1.531590 | 55.8 | | -1.580 | 0 | * |
| 22 | -20.9731 | 7.713 | | | | -1.580 | 0 | * |
| 23 | -16.0748 | 3.763 | 1.531590 | 55.8 | | -1.580 | 0 | * |
| 24 | -14.4400 | | | | | | | * |
| REFLECTING MIRROR | | | | | | | | |
| CONCAVE MIRROR | | | | | | | | |
| PROTECTIVE GLASS | | | | | | | | |
| PROTECTIVE GLASS | | | | | | | | |

FIG. 14A

| SURFACE NO. | 4 | 5 | 21 | 22 | 23 | 24 |
|---|---|---|---|---|---|---|
| 4TH ORDER COEFFICIENT (A) | 6.754533E-05 | 8.998097E-05 | 1.265734E-04 | 8.348544E-05 | 1.581804E-05 | 2.432986E-05 |
| 6TH ORDER COEFFICIENT (B) | 1.648657E-07 | 2.424654E-07 | 2.805398E-06 | 2.785732E-07 | -1.042775E-06 | -6.431941E-07 |
| 8TH ORDER COEFFICIENT (C) | 4.628668E-09 | 2.676809E-09 | -1.175890E-07 | -1.609644E-08 | 8.674213E-09 | 1.023597E-08 |
| 10TH ORDER COEFFICIENT (D) | -2.239349E-11 | 3.752763E-11 | 2.477547E-09 | 2.014444E-10 | -1.679850E-11 | -1.315066E-10 |
| 12TH ORDER COEFFICIENT (E) | -2.251519E-13 | -9.623309E-13 | -2.797101E-11 | -6.772161E-13 | -6.764244E-14 | 1.167487E-12 |
| 14TH ORDER COEFFICIENT (F) | 6.999759E-15 | 1.037164E-14 | 1.588011E-13 | -5.756977E-15 | 4.660086E-18 | -5.466930E-15 |
| 16TH ORDER COEFFICIENT (G) | 7.019872E-18 | 6.210838E-17 | -3.648928E-16 | 2.568936E-17 | 2.560544E-18 | 1.082869E-17 |

FIG. 14B

POSITION DATA

| | X | Y | Z | α |
|---|---|---|---|---|
| PLANAR MIRROR | 0 | 0 | 51.41658 | -45 |
| CONCAVE MIRROR | 0 | 55 | -13.8834 | -39.7 |
| 1ST SURFACE OF PROTECTIVE GLASS | 0 | 55 | 54.41658 | 0 |
| 2ND SURFACE OF PROTECTIVE GLASS | 0 | 55 | 57.41658 | 0 |
| 1ST SCREEN DISTANCE | 0 | -345 | | -90 |
| 2ND SCREEN DISTANCE | 0 | -130 | | -90 |

FIG. 14C

DISTANCES

| | 1ST SCREEN DISTANCE (mm) | 2ND SCREEN DISTANCE (mm) |
|---|---|---|
| 1ST TO 2ND LENS GROUPS | 6.765 | 6.678 |
| 2ND TO 3RD LENS GROUPS | 0.468 | 0.100 |
| 3RD TO 4TH LENS GROUPS | 7.713 | 7.609 |
| 4TH LENS GROUP TO REFLECTING MIRROR | 51.417 | 62.263 |

FIG. 15A

| | |
|---|---|
| c | 0 |
| k:Conic constant | 0 |
| C2:y | 0 |
| C3:x**2 | 5.865323E-03 |
| C4:y**2 | 2.337578E-03 |
| C5:x**2*y | 3.423455E-05 |
| C6:y**3 | 3.496337E-06 |
| C7:x**4 | 1.984721E-07 |
| C8:x**2*y**2 | 4.600061E-07 |
| C9:y**4 | 9.555183E-08 |
| C10:x**4*y | 3.905704E-09 |
| C11:x**2*y**3 | 5.817043E-09 |
| C12:y**5 | -1.659872E-09 |
| C13:x**6 | -1.148399E-10 |
| C14:x**4*y**2 | 1.269345E-11 |
| C15:x**2*y**4 | -8.714990E-11 |
| C16:y**6 | 1.567636E-10 |
| C17:x**6*y | -4.093437E-12 |
| C18:x**4*y**3 | -1.897754E-12 |
| C19:x**2*y**5 | 3.222636E-12 |
| C20:y**7 | -3.718560E-12 |
| C21:x**8 | 1.014542E-13 |
| C22:x**6*y**2 | -3.360712E-14 |
| C23:x**4*y**4 | 1.367558E-13 |
| C24:x**2*y**6 | -1.943463E-14 |
| C25:y**8 | -4.641221E-14 |
| C26:x**8*y | 3.087946E-15 |
| C27:x**6*y**3 | 2.823477E-15 |
| C28:x**4*y**5 | -1.137909E-15 |
| C29:x**2*y**7 | 3.460801E-15 |
| C30:y**9 | 2.402033E-15 |
| C31:x**10 | -4.887862E-17 |
| C32:x**8*y**2 | 5.944002E-17 |
| C33:x**6*y**4 | -1.094273E-17 |
| C34:x**4*y**6 | -2.200470E-16 |
| C35:x**2*y**8 | 5.888782E-18 |
| C36:y**10 | 1.641960E-17 |

FIG. 15B

| | |
|---|---|
| C37: x**10*y | -1.046341E-18 |
| C38: x**8*y**3 | -2.427625E-18 |
| C39: x**6*y**5 | -9.504204E-19 |
| C40: x**4*y**7 | 3.764637E-18 |
| C41: x**2*y**9 | -5.341394E-18 |
| C42: y**11 | -8.806410E-19 |
| C43: x**12 | 1.283673E-20 |
| C44: x**10*y**2 | -3.060072E-20 |
| C45: x**8*y**4 | -2.286890E-20 |
| C46: x**6*y**6 | 1.620773E-19 |
| C47: x**4*y**8 | 1.025548E-21 |
| C48: x**2*y**10 | 9.869502E-20 |
| C49: y**12 | -8.386263E-21 |
| C50: x**12*y | 1.476957E-22 |
| C51: x**10*y**3 | 1.098712E-21 |
| C52: x**8*y**5 | 5.367462E-22 |
| C53: x**6*y**7 | -3.022370E-21 |
| C54: x**4*y**9 | 1.622007E-21 |
| C55: x**2*y**11 | 2.493170E-22 |
| C56: y**13 | 4.072400E-22 |
| C57: x**14 | -1.411002E-24 |
| C58: x**12*y**2 | 5.514866E-24 |
| C59: x**10*y**4 | 4.135369E-24 |
| C60: x**8*y**6 | -2.728687E-23 |
| C61: x**6*y**8 | 5.081023E-25 |
| C62: x**4*y**10 | -4.991359E-23 |
| C63: x**2*y**12 | 1.757988E-23 |
| C64: y**14 | 3.608424E-24 |
| C65: x**14*y | -4.403313E-27 |
| C66: x**12*y**3 | -1.886875E-25 |
| C67: x**10*y**5 | 6.390447E-27 |
| C68: x**8*y**7 | 3.463802E-25 |
| C69: x**6*y**9 | 1.941834E-25 |
| C70: x**4*y**11 | 3.522594E-25 |
| C71: x**2*y**13 | 1.050086E-25 |
| C72: y**15 | 8.728168E-27 |

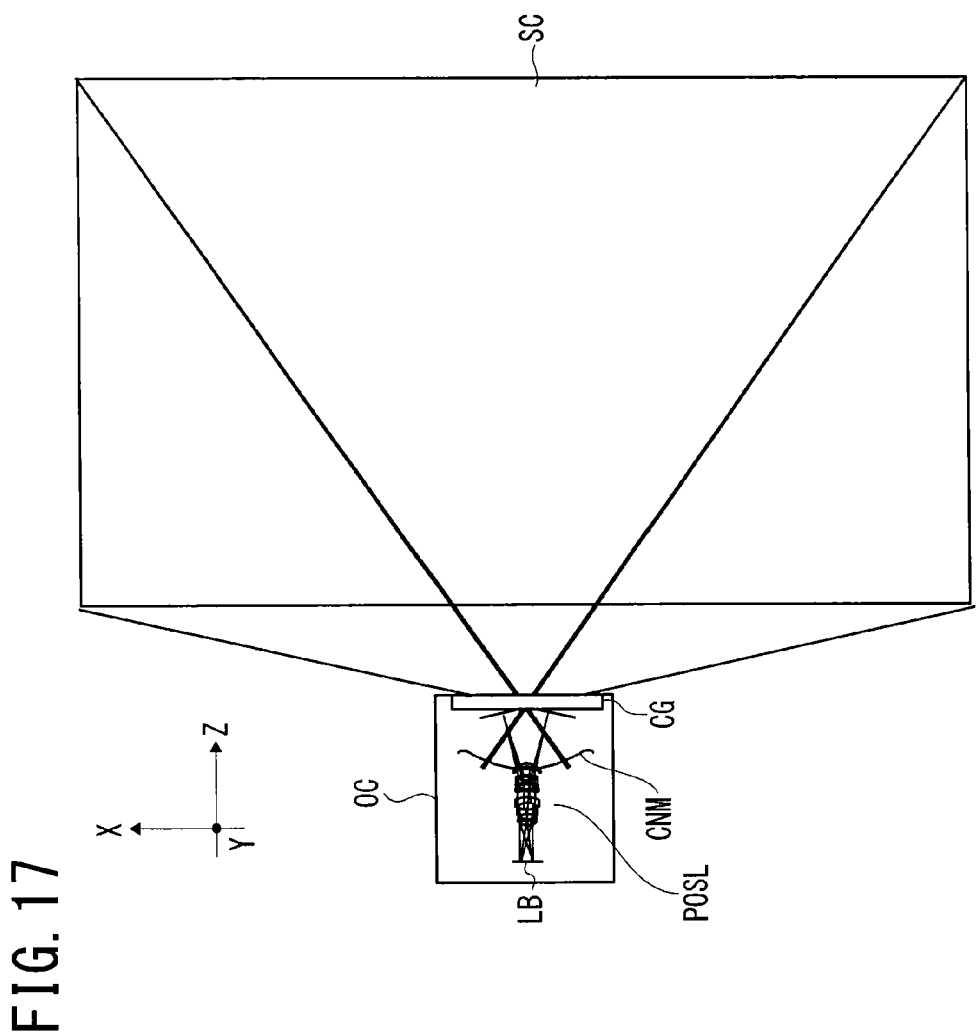

MAGNIFICATION OPTICAL SYSTEM

CROSS REFERENCE TO RELATED APPLICATION

The present application is a continuation of U.S. patent application Ser. No. 13/669,079 filed Nov. 5, 2012, the entire contents of which is incorporated herein by reference. U.S. patent application Ser. No. 13/669,079 is related to the U.S. patent application entitled "IMAGE DISPLAY DEVICE", which claims the benefit of priority to Japanese patent application No. 2011-242679 filed on Nov. 4, 2011.

BACKGROUND OF THE INVENTION

1. Field of the Invention

The present invention relates to a magnification optical system which can be used in various kinds of projector.

2. Description of the Related Art

Referring to FIG. 1, the structure and function of a general projector type image display device using a reflective light bulb is described.

In FIG. 1 a projector includes a reflective light bulb LB, a light source LS, a mirror M, an integrator rod IR, a lens LN, a curved mirror CM, and a magnification optical system POS.

The light source LS includes a lamp LP and a reflector RF to project a light beam to the light bulb LB.

The integrator rod IR, lens LN, mirror M, and curved mirror CM constitute an illumination system to guide the light beam from the light source LS to the light bulb LB.

The integrator rod IR is a light pipe made of four mirrors combined as a tunnel, to reflect an incident light beam with mirror surfaces to an exit.

The magnification optical system POS projects the reflected beam from the light bulb LB onto a target surface or a screen to form an enlarged image thereon. The light bulb LB is a digital micro mirror device (DMD) in which micro mirrors are arranged in array. The normal line of the micro mirrors can be changed independently from each other by ±12 degrees, for example.

The light from the lamp LP is reflected by the reflector RF, converged on the entrance of the integrator rod IR, repeatedly reflected therein, and projected as a light beam with uniform luminance. Then, the light beam illuminates the light bulb LB via the illumination system.

The illumination system converts the light beam from the integrator rod IR to a surface light source with uniform luminance and forms an image of the surface light source on the light bulb LB.

The positions of the light bulb LB and the magnification optical system POS are determined so that light is reflected by the micro mirrors in the light bulb LB to be incident on the magnification optical system POS when the micro mirrors are inclined by −12 degrees and light reflected thereby is not incident on the magnification optical system POS when the micro mirrors are inclined by +12 degrees. Then, the direction in which the light beam from the curved mirror CM is incident on the light bulb LB is decided.

An image can be displayed on the light bulb LB by adjusting the inclination of each micro mirror in accordance with the pixels of an image projected on a target surface.

By illuminating the light bulb LB on which the image is displayed with light, the light beam reflected by each micro mirror is incident on the magnification optical system and converted thereby to imaging light. The imaging light forms an enlarged image of the image on the light bulb Lb on the target surface. This image is called as projected image.

Since the light bulb is illuminated with light with uniform luminance distribution, the projected image has uniform illumination distribution. Thus, a digital image is displayed on the target surface.

The projector functions to project an image as a real image of the image on the light bulb LB onto the target surface such as a screen. The size of the projected image or the distance from the projector to the target surface differs depending on the specific condition of the projector in use.

A projected image needs to be brought into focus on the target surface. FIG. 2A shows a magnification optical system POS1 including lenses in coaxial, rotational symmetry with an optical axis AX. The focus of an image on the screen SC is generally adjusted by moving the entire magnification optical system or moving a focus lens group.

FIG. 2B shows a projector which uses a magnification optical system comprising a refracting optical train POSL1 and a mirror train POSM1 (a single concave mirror in the drawing) not coaxial with the refracting optical train POSL1. It aims to project images in a closer distance than a related art projector.

To be easily viewable in an extremely close distance, an image needs to be projected above the projector. The light bulb LM (DMD) is eccentrically disposed with its center off the optical axis AX of the magnification optical system as shown in FIG. 2A, 2B. To realize a wide projection area and maintain image quality, a wide angle lens is used for the magnification optical system. However, there is a limitation to widening the angle of the magnification optical system of lenses in coaxial, rotational symmetry, and an optical path has to be extended by a mirror train in order to project images from an extremely close position adjacent to the screen SC.

An image can be projected in a close distance by oblique projection by which the optical path of the magnification optical system is reflected by a planar mirror to incline the optical axis thereof relative to the screen. However, this type of projection faces a problem that a projected image is distorted to a trapezoidal shape.

In FIG. 2B the concave mirror of the mirror train POSM1 with a free-form curved surface can effectively correct a trapezoidal distortion in a projected image. The correction of trapezoidal distortion with a free-form curved mirror is disclosed in detail in "Optical and Electro-optical Engineering Contact, Vol. 39, No. 9 in 2001 by Japan Optomechatronics Association".

A floating focus system is suitable for the projector comprising the refracting optical train POSL1 and the mirror train POSM1 including a free-form curved surface to correct a trapezoidal distortion in FIG. 2B. This system is to perform focusing at an extremely close range by fixing one or more lenses closest to the light bulb LB and moving the other lens groups and mirrors along the optical axis like moving "floating trees". It is widely applied for an interchangeable lens of a single lens reflex camera.

However, it is not possible to sufficiently correct the trapezoidal distortion in an image projected at an extremely close distance by focusing with a single lens or lens groups or protruding the entire magnification optical system. Further, curvature of field cannot be sufficiently corrected, leading to blurs in the center and periphery of the display.

Meanwhile, the floating focus system can properly correct trapezoidal distortion and curvature of field in an image projected from an extremely close distance by the non-coaxial curved mirror.

This is described in detail referring to FIGS. 3A, 3B. FIG. 3A shows a projector which obliquely projects images. A magnification optical system POS0 projects an image on the screen SC. A planar mirror to reflect an optical path is omitted therefrom for simplicity.

The display surface of the light bulb LB as DMD is of a rectangular shape with vertical (Y direction) short sides but the projected image is a trapezoidal shape as shown in FIG. 3B.

FIG. 4A shows another projector comprising a magnification optical system having a refracting optical train POSL1 and a mirror train POSM1 as a concave mirror. The surface of the light bulb LB on which images are displayed is rectangular as shown in FIG. 4B. The refracting optical train POSL1 forms a real image on the display as an intermediate image Im0 between the refracting optical train POSL1 and the mirror train POSM1. The mirror train POSM1 projects the intermediate image Im0 on the screen SC as an object image.

The intermediate image Im0 formed by the refracting optical train POSL1 is distorted to a trapezoid with a narrow top portion as shown in FIG. 4B. The distortion is corrected by the mirror train POSM1 and a corrected rectangular image is projected on the screen SC, as shown in FIG. 4B.

To project a smaller image onto the screen SC with the projector in FIG. 4A, the screen SC is moved rightward in Z direction from the position in FIG. 4A and focus adjustment is performed by protruding the coaxial refracting optical train POSL1 in Z direction as shown in FIG. 5A.

The distortion in the intermediate image Im0 shows almost no change before and after the protrusion of the refracting optical train POSL1 and the shape thereof in FIG. 5B is similar to that of the screen in FIG. 4B. Accordingly, a trapezoidal distorted image in FIG. 5B is projected on the screen SC.

This effect is described in detail with reference to FIGS. 6A to 6D. FIG. 6A shows an X to Z cross section of FIG. 4A. In FIG. 6A the magnification optical system including the concave mirror POSM1 projects light at different angles upward and downward in Y direction on an XZ cross section of the screen SC. FIG. 6C shows a rectangular image properly projected by the magnification optical system in FIG. 6A.

When the screen SC is moved as in FIG. 5A, a trapezoidal distortion with a short top side occurs due to light's reaching different positions in X direction on top and bottom of the screen SC, as shown in FIG. 6B.

When the light bulb and the refractive optical system are disposed in a proper distance along the normal line of the light bulb, the floating focusing is very effective to correct trapezoidal distortion in an image and curvature of field. Further, owing to the good correction of curvature of field, the floating focusing is effective when focus adjustment amounts are largely different in the top and bottom of the display, for example, when the screen SC is moved to the curved mirror POSM1 from a position SC1 (FIG. 4A) to a position SC2 (FIG. 5A).

Meanwhile, for correcting the same focus adjustment amount on the entire screen, not the floating focusing but the focusing by protruding the entire magnification optical system or the front lens group is effective.

Various methods for the focusing of the projector are well known, for example, disclosed in Japanese Patent Application Publication No. 2009-251457, No. 2009-229738, and No. 2008-165187.

Thus, floating focusing can correct blurs in the center and periphery of an image on the display but it cannot deal with blurs in the entire image due to a variation in the distance between the refractive optical system and the light bulb or a variation in the focal length of the refractive optical system.

SUMMARY OF THE INVENTION

An object of the present invention is to provide a magnification optical system made up of a refractive optical system and a mirror train and capable of correcting blurs in the center and periphery of a display and an image.

According to one aspect of the present invention, a magnification optical system to form an enlarged image of an object, includes a refractive optical system including a plurality of lens groups and a mirror train including a curved mirror, arranged in this order from an object side, a first focus structure configured to move the respective lens groups of the refractive optical system by different amounts along a normal line of a conjugate surface on the object side, and a second focus structure configured to move the respective lens groups along the normal line of the conjugate surface on the object side by different amounts from those of the first focus structure.

BRIEF DESCRIPTION OF THE DRAWINGS

Features, embodiments, and advantages of the present invention will become apparent from the following detailed description with reference to the accompanying drawings:

FIG. 13 is a table showing data on the refractive optical system in the first embodiment;

FIGS. 14A to 14C show specific lens data in the first embodiment;

FIGS. 15A, 15B show data on the surface shapes of concave mirrors in the first embodiment;

FIG. 17 shows another example of a magnification optical system mounted in the exterior package OC.

DETAILED DESCRIPTION OF PREFERRED EMBODIMENTS

Hereinafter, embodiments of the present invention will be described in detail with reference to the accompanying drawings. Wherever possible, the same reference numbers will be used throughout the drawings to refer to the same or like parts.

The following embodiments will describe a DMD as a light bulb by way of example. However, an image display element should not be limited to the DMD and various light bulbs such as LD panel, LCOS panel can be used.

Figure 1:
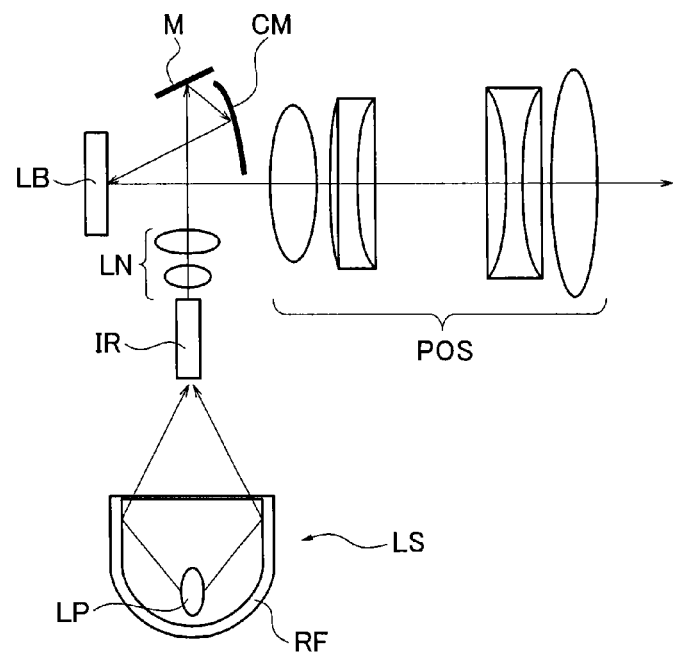
FIG. 1 shows the structure of a general projector.
Figure 2A:
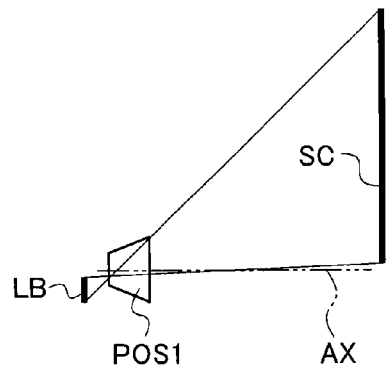
FIGS. 2A, 2B show the focus adjustment of a projected image.
Figure 2B:
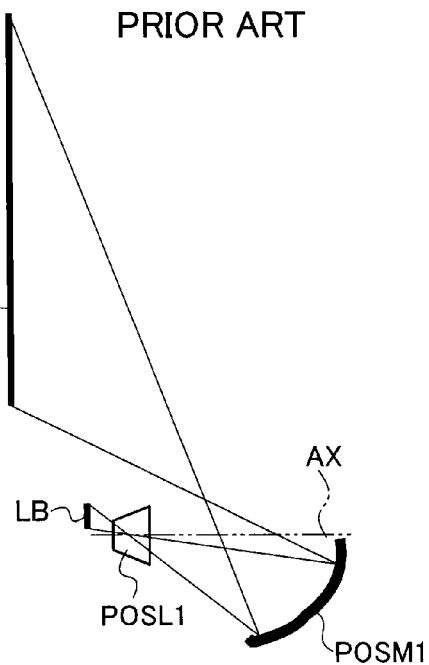
Figure 3A:
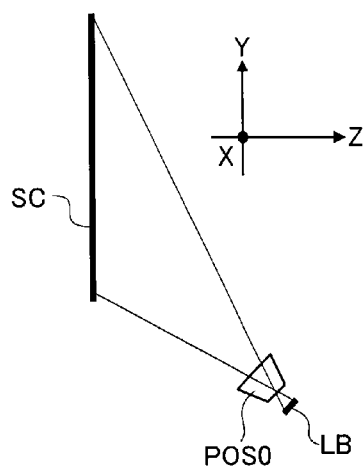
FIGS. 3A, 3B show a trapezoidal distortion of a projected image.
Figure 3B:
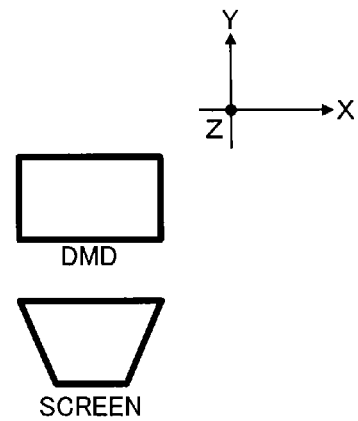
Figure 4A:
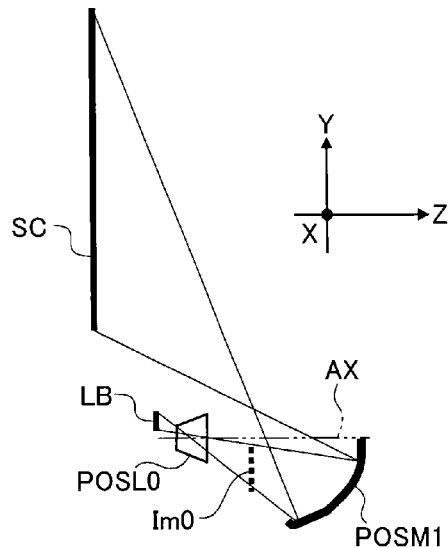
FIGS. 4A, 4B show the correction of the trapezoidal distortion.
Figure 4B:
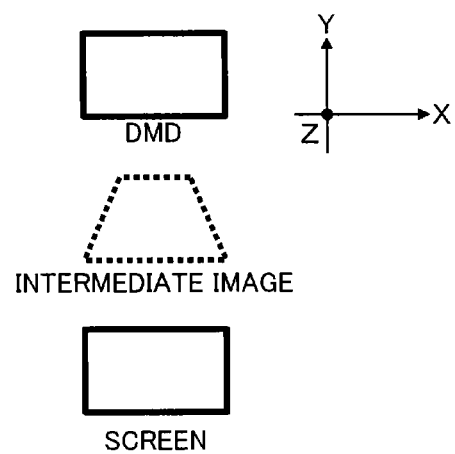

Note that in the drawings a light source and an illumination system to guide light to a light bulb from a light source are omitted for simplicity. In reality the illumination system in FIG. 1 comprising the integrator rod IR, lens LN, mirror M, and curved mirror to illuminate the light bulb LB is used. Needless to say that the type of a light source or an illumination system can be arbitrarily determined in accordance with the type or configuration of an image display element.

First Embodiment

Figure 8:
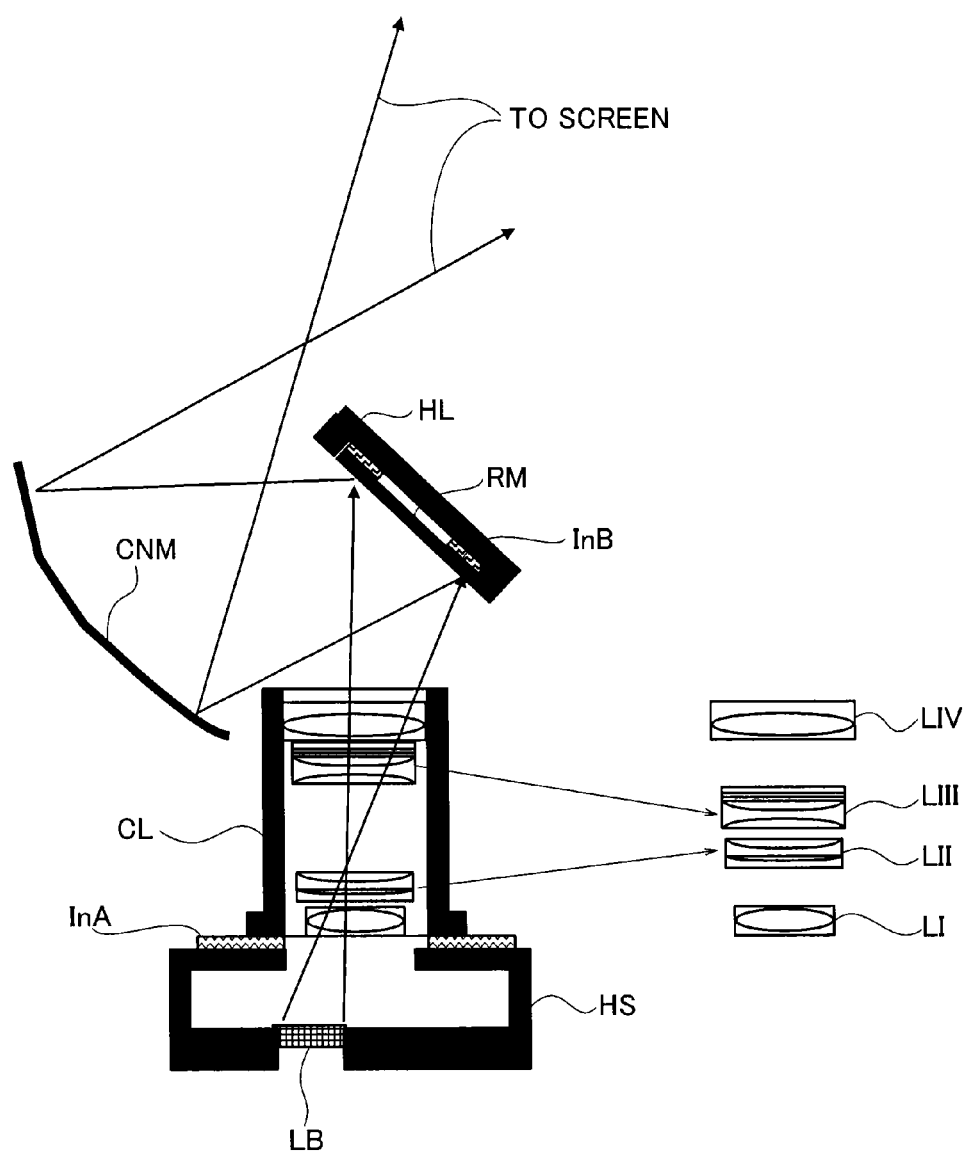
FIG. 8 shows the essential part of an image display device including a magnification optical system according to a first embodiment.

FIG. 8 shows an example of a magnification optical system according to a first embodiment used in an image display device. The image display device comprises an illumination system, a magnification optical system including a refractive optical system, a light source and a light bulb LB. The light bulb LB is a digital micro mirror device (DMD) and held in a housing HS. A lens barrel CL is connected with the housing HS via a first intervenient element InA. The refractive optical system is contained in the lens barrel CL and it comprises first to fourth lens groups LI, LII, LIII, LIV arranged in this order from the light bulb side.

The image display device also comprises a reflecting mirror RM held in a holder HL via a second intervenient element InB, and a concave mirror CNM as a mirror train.

A light beam from the light source illuminates the display surface of the light bulb LB via the illumination system, and is reflected thereby, changed in intensity by an image displayed on the surface and incident on the refractive optical system.

Then, the light beam is reflected by the reflecting mirror RM and concave mirror CNM to a not-shown screen as a target surface to form, on the screen, an image enlarged from the image displayed on the light bulb.

It is preferable for the optical system to converge the light beam once via the reflecting mirror RM by forming a real image on the light bulb or the conjugate surface on the object side as an intermediate image on an optical path between the refractive optical system and the concave mirror CAN, for the purpose of reducing a dispersion of the reflected light by the reflecting mirror RM.

Figure 7:
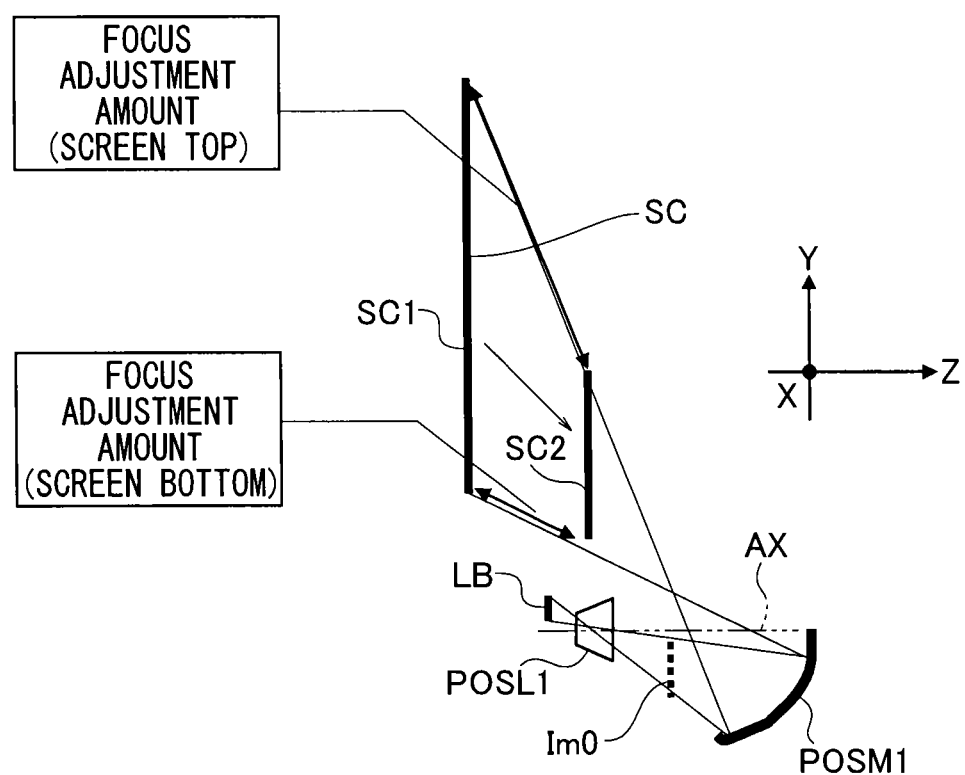
FIG. 7 shows the image projector using a mirror train when the position of a screen is changed.

Now, focus adjustment by floating focusing is described. Although not shown in FIG. 8, when the position of the screen is changed from the position SC1 to SC2 in FIG. 7, different focus adjustment amounts on the top and bottom of the screen are corrected by floating focusing. In the present embodiment the second and third lens groups LII, LIII of the refractive optical system are moved along the optical axis.

The lens barrel CL includes not-shown cam grooves inside, for example, and pins of the second and third lens groups LII, LIII are fitted into the cam grooves. Thereby, the second and third lens groups LII, LIII can be moved in different directions by rotating the lens barrel CL. This cam mechanism is a first focus structure. Although not shown, the lens barrel CL is of a complex structure comprising several elements.

Meanwhile, the size of manufactured housings varies so that a distance between the light bulb LB and the first lens group LI also varies in the lens barrel CL mounted in the housing in accordance with a variation in the size of the housing HS. Similarly, manufactured lenses and concave mirrors used in the refractive optical system also vary in shape, causing a variation in the focal length of the refractive optical system and in the optimal distance between the light bulb LB and the first lens group LI.

To properly set the distance between the light bulb LB and the first lens group LI even with the two kinds of variation, the magnification optical system according to the present embodiment comprises a first intervenient element InA between the light bulb LB and the first lens group LI.

The first intervenient element InA can be made of thin plates in thickness of about 0.1 mm and the total thickness thereof is adjustable by changing the number of the thin plates. Accordingly, the distance between the light bulb LB and the first lens group LI is adjustable in unit of 0.1 mm.

Alternatively, the first intervenient element InA can be aluminum plates in different thicknesses in unit of 0.1 mm, for example. One of the plates in an optimal thickness for a combination of the housing HS and the refractive optical system is selected and inserted therebetween. Thereby, the distance between the light bulb LB and the first lens group LI is adjustable in unit of 0.1 mm.

It is preferable to fix the first intervenient element InA, housing HS, and lens barrel CL with screws, for example after adjusting their positions.

Further, the magnification optical system comprises a second intervenient element InB between the reflecting mirror RM and holder HL, to adjust an optical path length between the fourth lens group LIV and concave mirror CNM and correct a displacement of the positions thereof from the assembled positions. The displacement occurs because of the adjustment of the positions of the light bulb LB and the first lens group LI.

The second intervenient element InB can be aluminum plates in different thicknesses or made of thin plates as the first intervenient element InA, to be able to easily, precisely adjust the optical path length.

Further, with use of thin plates for the first and second intervenient elements InA, InB, the first intervenient element InA and housing HS or the second intervenient element InB and holder HL can be fixed at plural points with screws, for example. By changing the number of the plates inserted therebetween at each fixing point, it is possible to correct an error in the inclination of the light bulb LB and refractive optical system or the curved mirror CNM and refractive optical system.

The first and second intervenient element InA, InB constitute a second focus structure.

According to the present embodiment, it is made possible to adjust the distance between the lens barrel CL and the housing HS by simply inserting the first intervenient element InA of a simple structure and a special structure is unnecessary. Since the housing HS which is close to the light bulb LB and receives heat therefrom does not directly contact the lens barrel CL, the heat is not easily transmitted to the lens barrel CL. Thus, out-of-focus images due to thermal expansion of lenses can be prevented.

As described above, the magnification optical system according to the first embodiment comprises the first and second focus structures. The first focus structure is configured to perform focus adjustment of a projected image by floating focusing in which the second and third lens groups LII, LIII of the refractive optical system are moved by different amounts along the normal line of the light bulb or a conjugate surface on the object side, when the distance between the screen and concave mirror CNM is changed.

The second focus structure is configured to properly position the light bulb, refractive optical system, and concave mirror (mirror train) in the assembly of the optical systems of the image display device and bring a projected image into focus at default position.

Second Embodiment

Now, an image display device incorporating a magnification optical system according to a second embodiment is described with reference to FIG. 9. The second embodiment differs from the first embodiment in that a screw structure BS is provided to adjust the distance between the light bulb LB and first lens group LI in replace of the first intervenient element InA.

The screw structure BS adjusts the distance between the light bulb LB and first lens group LI. It constitutes the second focus structure together with the second intervenient element InB, so that the distance is adjusted with the screw structure in the assembly process of the optical systems and the screw structure BS is secured after the adjustment, so as not to allow a user to adjust it.

Note that the second focus structure should not be limited to the first and second intervenient elements InA, InB and the screw structure BS. Any structure can be arbitrarily used as long as it can achieve the same functions.

Third Embodiment

A magnification optical system according to a third embodiment is described with reference to FIG. 10. In the present embodiment the refractive optical system is comprised of the first to fourth lens groups LI to LIV.

In the present embodiment the focus adjustment of a projected image is done by floating focusing in which the second and third lens groups LII, LIII are moved. The fourth lens group LIV is fixed. That is, the second and third lens groups LII, LIII and a moving mechanism therefor constitute the first focus structure.

Meanwhile, the second focus structure is comprised of the fourth lens group LIV and a structure to move it along the optical axis.

Moving the fourth lens group LIV along the optical axis can attain the same focusing effects as those by the protrusion of the entire lens barrel in the first and second embodiments. The fourth lens group LIV is moved by a cam structure different from the one for the second and third lens groups LII, LIII in the assembly process of the optical systems. After the adjustment, it is fixed so as not to allow a user to operate it.

While an image is projected on a target surface, the first focus structure moves the second and third lens groups LII, LIII for the focus adjustment of the image. Moving the fourth lens group IV is more preferable than the focusing by the protrusion of the entire lens barrel since the first and second focus structures are independent cam mechanisms and a unit of lens moving amount for focusing is small so that an error such as inclination caused from the adjustment is reduced.

Figure 9:
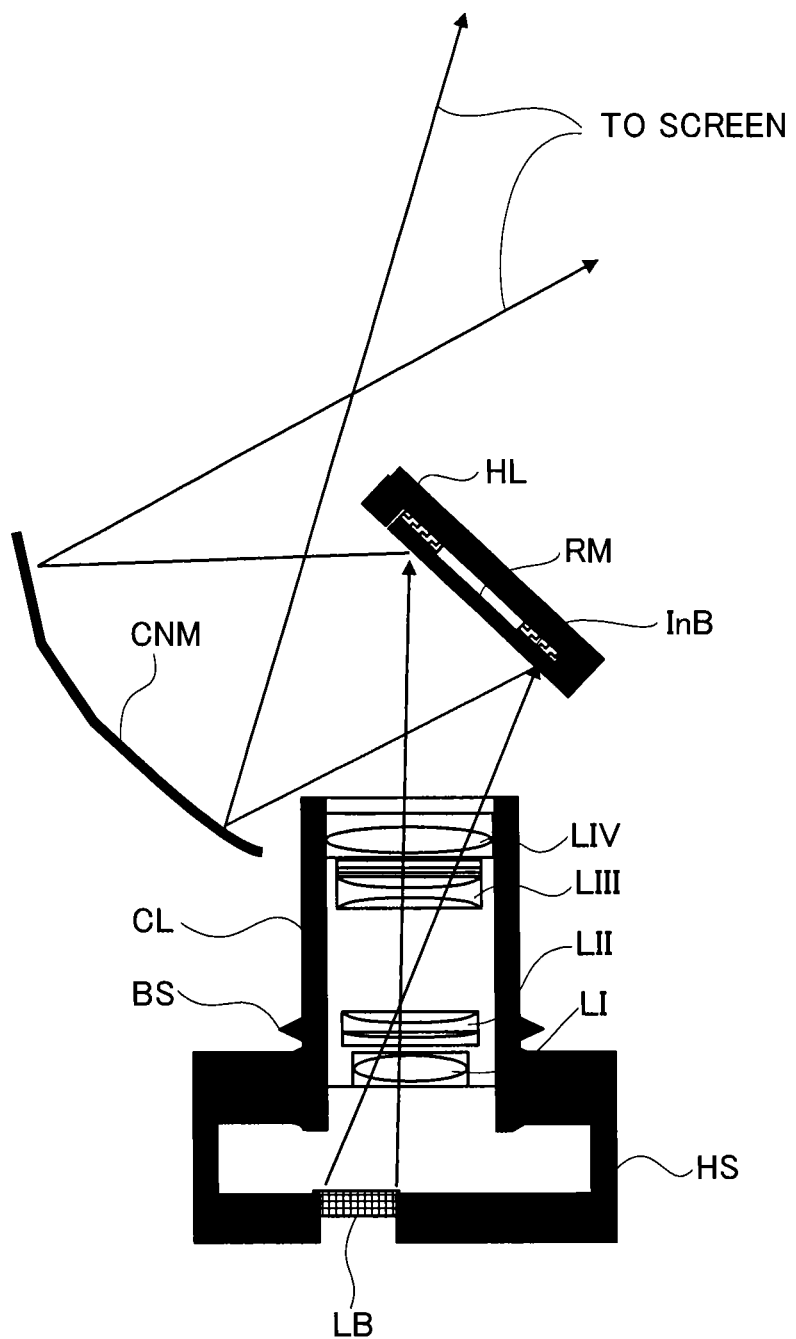
FIG. 9 shows an image display device including a magnification optical system according to a second embodiment.
Figure 10:
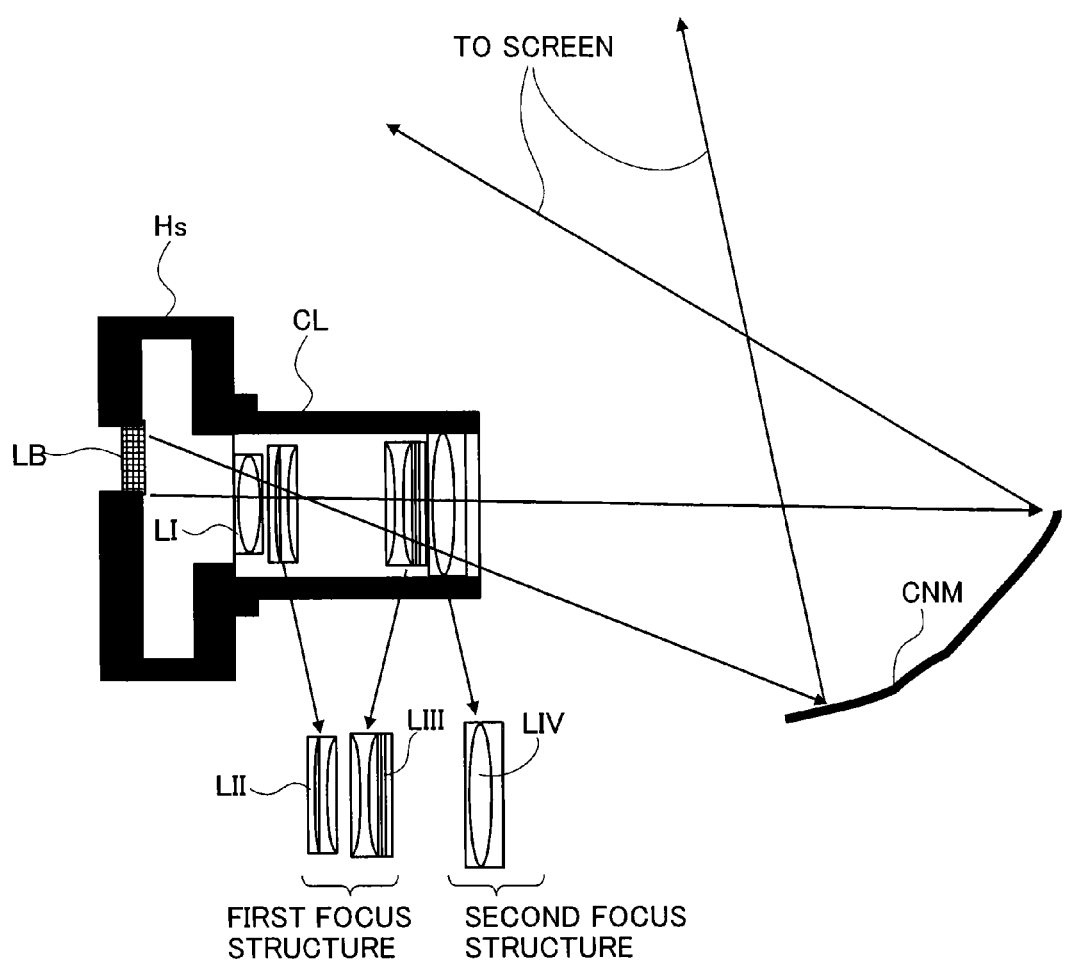
FIG. 10 shows an image display device including a magnification optical system according to a third embodiment.

However, with use of the reflecting mirror RM in FIGS. 8, 9, in moving the fourth lens group LIV away from the light bulb LB as shown in FIG. 10, it is necessary to dispose the fourth lens group IV so as not to block the light beam reflected by the reflecting mirror RM to the concave mirror CNM.

The examples of the structure of the refractive optical system according to the first to third embodiments are described with reference to FIGS. 11 to 17.

Figure 11A:
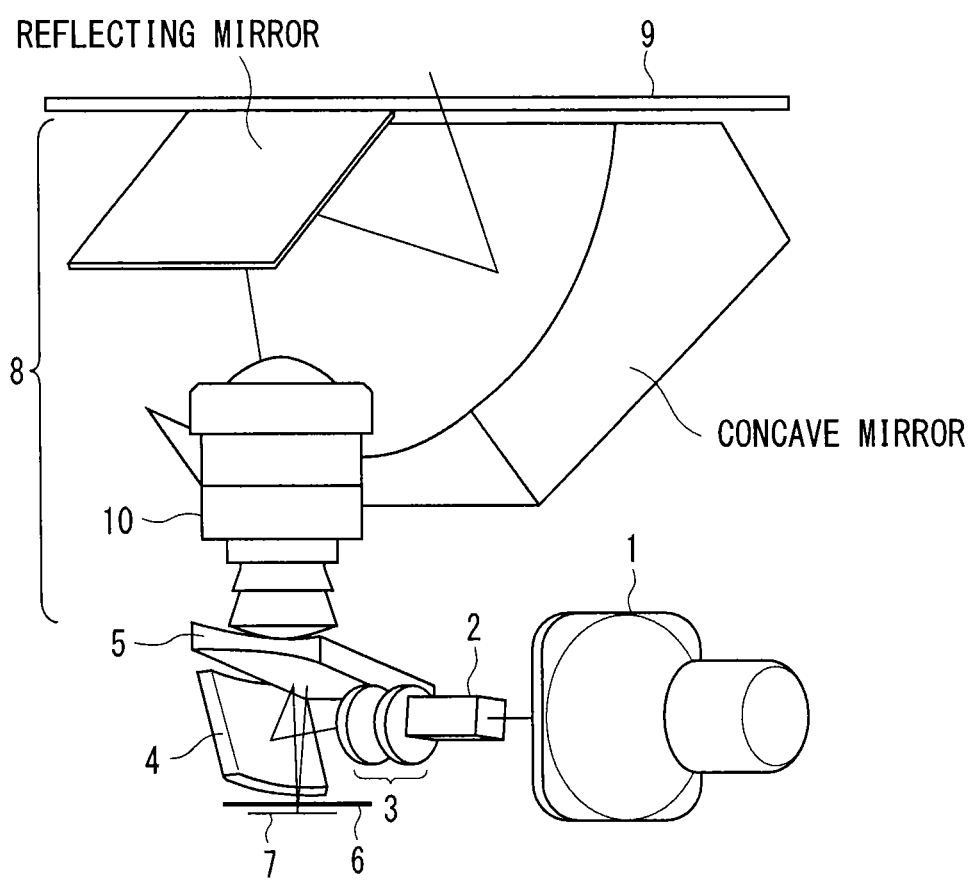
FIGS. 11A, 11B show examples of a refractive optical system used in the devices according to the first to third embodiments.
Figure 11B:
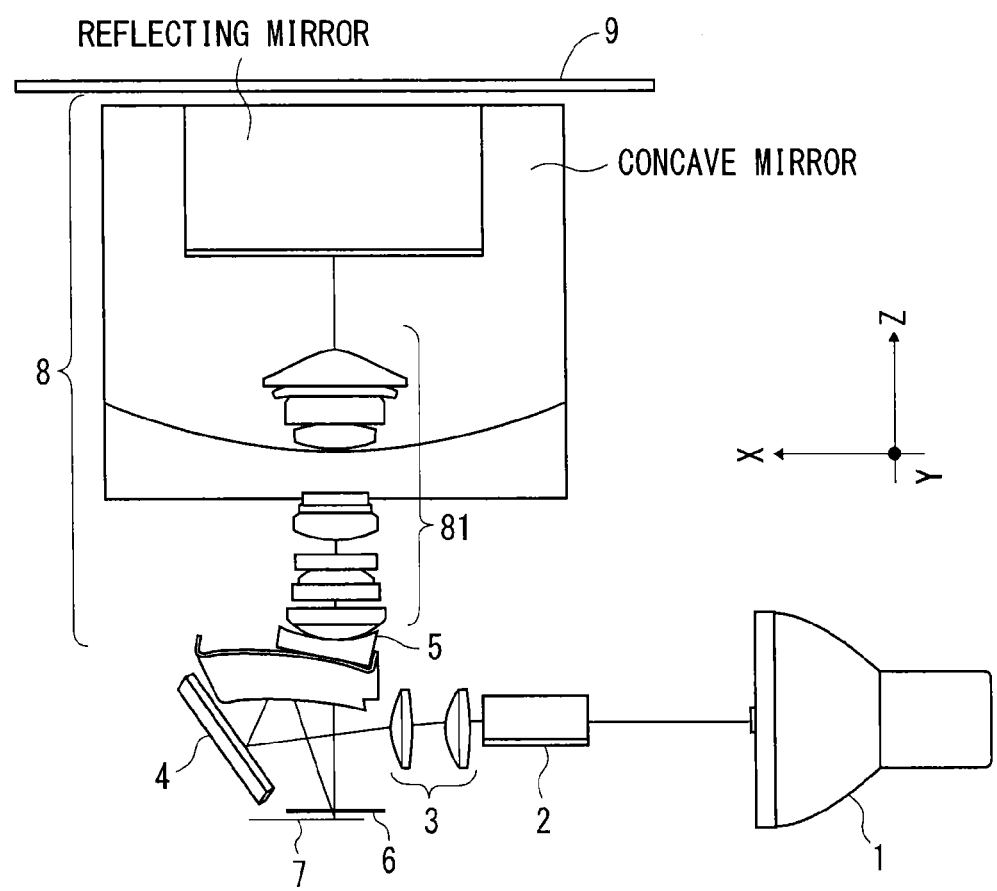

In FIGS. 11A, 11B an illumination system includes a lamp 1 as a light source, an integrator rod 2, a lens 3, a mirror 4, a curved mirror 5, and a concave mirror with a free-form curved surface (equivalent to the concave mirror CNM). The curved mirror 5 is a concave mirror with a spherical reflective surface. FIG. 11B shows a refractive optical system 81.

A projector system 8 includes a light bulb 7, and a protective cover glass 6 for the light bulb, a protective glass 9 for the concave mirror, a lens barrel 10 containing the first to fourth lens groups.

The lens barrel 10 includes three different cam grooves to move three of the four lens groups separately. Note that the cam groove closest to the light bulb 7 does not move at all so that it is irrelevant of focusing.

Figure 12:
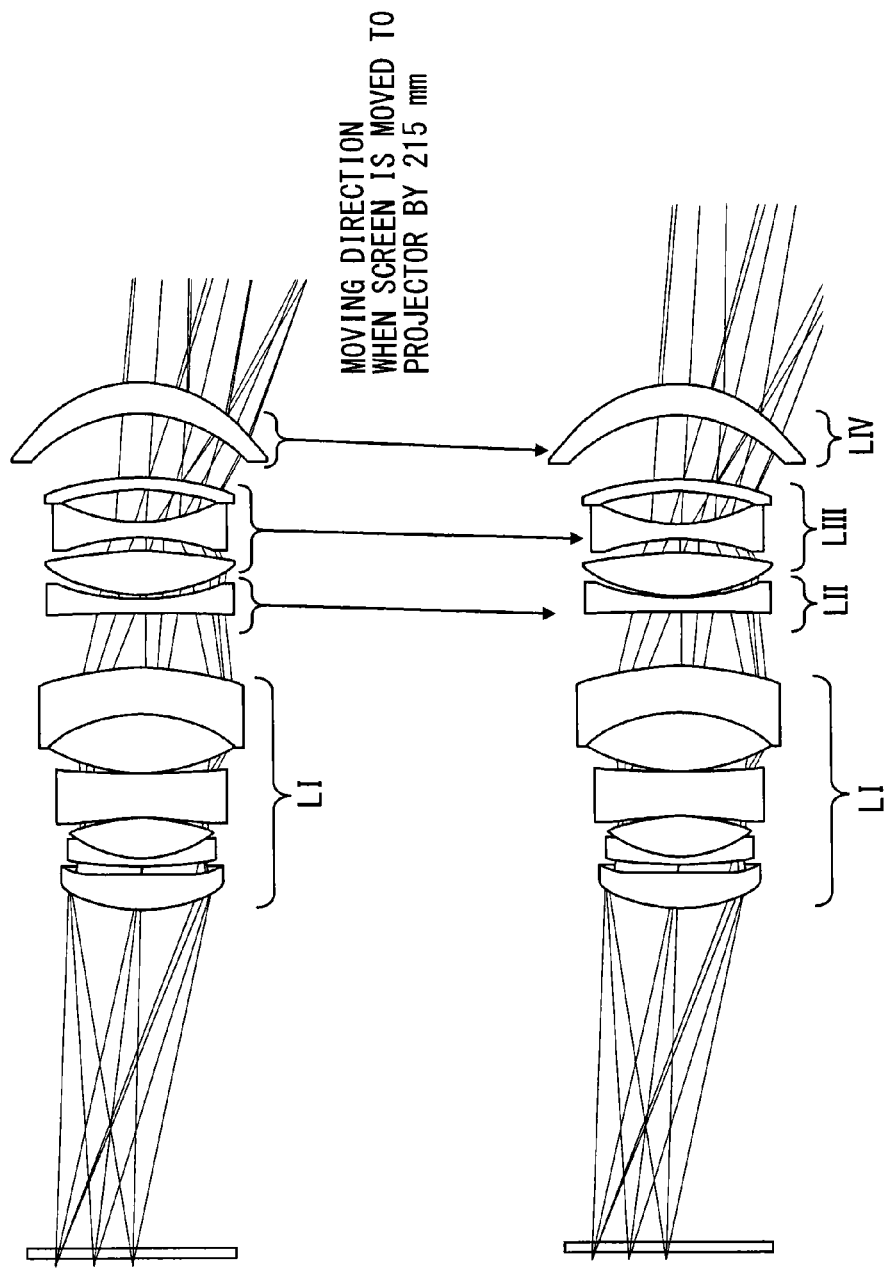
FIG. 12 shows an example of the structure of the refractive optical system.

FIG. 12 shows an example of the structure of the refractive optical system 81. It is made up of four lens groups of 11 lenses. A first lens group LI is made of 6 lenses, a second lens group LII is a single lens, a third lens group LIII is made of 3 lenses and a fourth lens group LIV is a single lens.

Specific data on the lenses of the refractive optical system in FIG. 12 are shown in FIGS. 13 to 15. FIG. 13 shows the curvature radius of each lens surface, face interval (mm), the refractive index and Abbe number of material, the aperture radius of a diaphragm, eccentricity Y and $\alpha$, and aspheric surfaces.

Figure 5A:
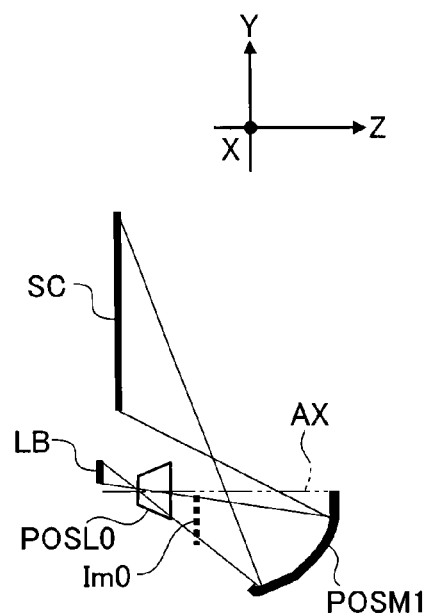
FIGS. 5A, 5B show an example of insufficient correction of the trapezoidal distortion of an image projector using a mirror train.

Curvature radius at 0.000 represents infinity $\infty$, that is, planar surface. Eccentricity Y is a shift amount (mm) of the refractive optical system 81 along the optical axis downward in Y (vertical) direction (FIG. 5A). Eccentricity $\alpha$ is a shift amount (mm) of the concave mirror and protective glass relative to a plane including the optical axis (Z direction) and a lateral direction of the light bulb. The asterisk * in the aspheric surface represents that the lens surface is aspherical.

LB (0) in the face No. column represents a display surface of the light bulb and No. 1, 2 are both surfaces of a cover glass.

Curvature radius "1.0E+18" represents "$1*10^{18}$" and the surfaces with this curvature radius is approximately planar. The values of the aspheric surface are paraxial curvature radius.

FIG. 14A shows data on the aspheric surfaces in FIG. 13. The aspheric surfaces can be expressed by a known formula:

$$D=CH^2/[1+\sqrt{\{1-(1+K)\}C^2H^2}]+\Sigma E_{2j}H^{2j} \ (j=1 \text{ to } 8)$$

where C is paraxial curvature (inverse of paraxial curvature radius), K is conic constant, $E_{2j}$ is high-order aspheric coefficient (J=2 to 8), H is coordinate in orthogonal direction to the optical axis, and D is depth along the optical axis.

In the fourth embodiment the conic constants of the aspherical surfaces of the refractive optical system are all zero.

FIG. 14B shows the position data of the reflecting mirror, concave mirror, first and second surfaces of the protective glass, and first and second screen distances (SC1, SC2 in FIG. 7) in X, Y, Z directions relative to the vertex of the lens surface closest to the reflecting mirror.

FIG. 14C shows specific moving amounts (mm) of the lens groups at the first and second screen distances. FIGS. 15A, 15B show data on the surface shape of the concave mirror CNM.

Figure 5B:
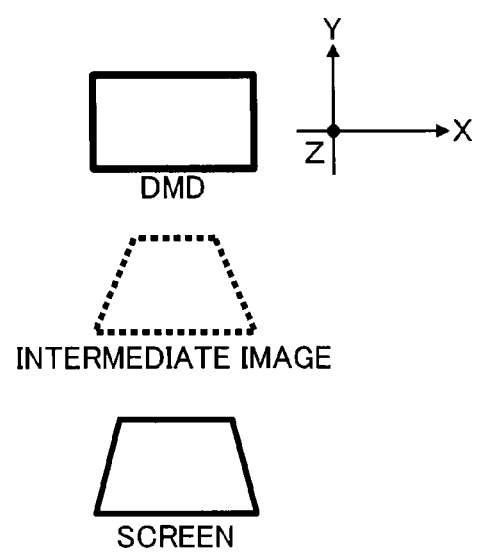
Figure 6A:
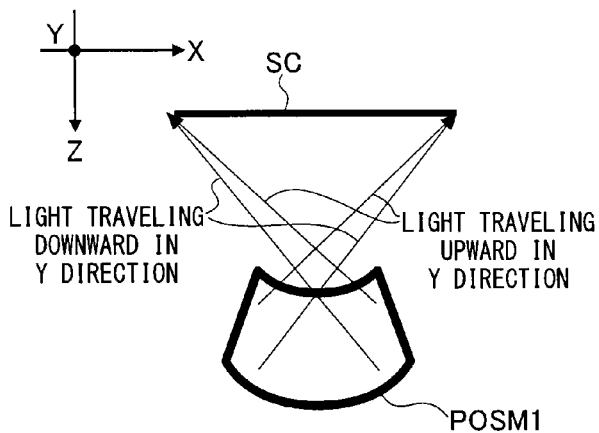
FIGS. 6A to 6D show another example of insufficient correction of the trapezoidal distortion.
Figure 6C:
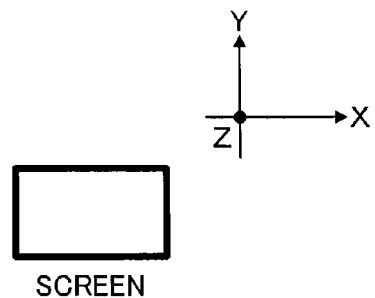
Figure 6B:
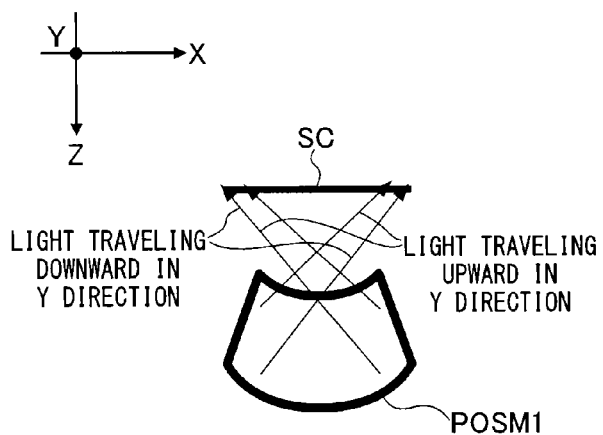
Figure 6D:
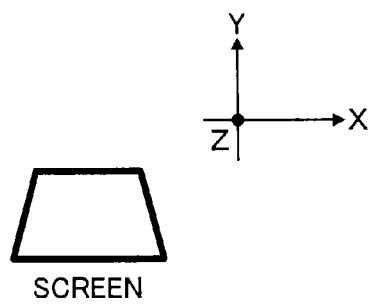

The surface of the concave mirror CNM is a free-form curved surface, and it is expressed by the following formula:

$$Z=cr^2/[1+\sqrt{\{1-(1+k)c^2r^2\}}]+\Sigma C_j * x^m y^n$$

where c is paraxial curvature radius, K is conic constant, $C_j$ is a high-order coefficient (j=2 to 72), r is a distance in orthogonal direction relative to the optical axis, z is a sag amount of a surface parallel to the optical axis, and x, y are coordinates in X and Y directions in FIGS. 5A, 5B, respectively.

In FIGS. 15A, 15B "x**4*y**7" in C40 represents $x^4 xy^7$, for example.

The first lens group LI is made of six lenses and fixed during the use of the image display device. The second and third lens groups LII, LIII are moved by different amounts for floating focusing. Further, at the assembly of the optical systems, the focus of an entire projected image is adjusted by moving the fourth lens group LIV and thereafter, the fourth lens group LIV is fixed.

Figure 16:
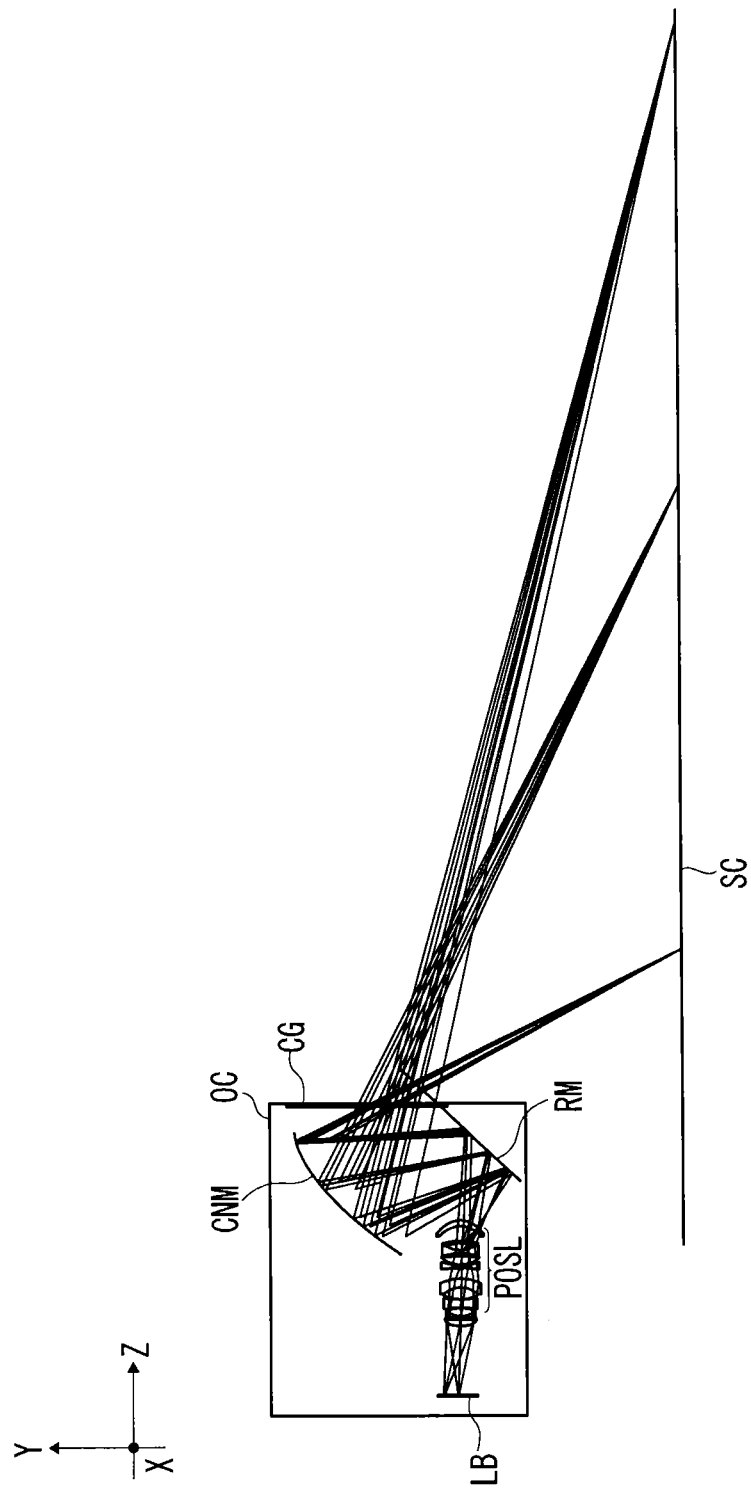
FIG. 16 shows an example of a magnification optical system mounted in an exterior package OC.

FIGS. 16, 17 show examples of a projector with a magnification optical system mounted in an exterior package OC. The light bulb LB, refractive optical system POSL, and mirror trains RM, CNM are contained in the exterior package OC. A light beam is projected therefrom via a cover glass CG and imaged on the screen SC.

The lens barrel is mechanically structured so that a focus lever of the first focus structure for floating focusing is exposed outside the exterior package OC. For example, if the screen SC is moved vertically or in Y direction in FIG. 16, the image can be brought into focus by moving the focus lever. Thus, images with good resolution as a whole can be projected on the screen.

The second focus structure is accommodated inside the exterior package OC and cannot be exposed outside, so as not to allow a user to operate it.

With no use of the reflecting mirror, the second focus structure can be a protrusion mechanism to move the entire refractive optical system along the normal line of the light bulb or the conjugate surface on the object side. It can be a lens barrel with a screw mechanism to hold the refractive optical system and be protruded by the rotation of the screw mechanism.

Alternatively, the protrusion mechanism can be comprised of a lens barrel holding the refractive optical system and one or more intervenient elements provided between the lens barrel and the housing containing the light bulb. The housing and the lens barrel can be integrated via the intervenient elements.

Further, the second focus structure can be a front focus mechanism to move one lens group of the refractive optical system farthest from the light bulb along the normal line of the light bulb or the conjugate surface on the reduction side.

In the image display device the refractive optical system and the mirror train are positioned so that a light beam from the light bulb is incident on the mirror train via the refractive optical system and reflected thereby to the target surface. The magnification optical system can include, between the refractive optical system and the mirror train, a reflecting mirror to bend an optical path and be held in a structure which is adjustable of the position of the reflecting mirror.

The structure holding the reflecting mirror can be configured of a holder for the reflecting mirror and one or more intervenient elements disposed between the holder and the reflecting mirror. The curved mirror of the mirror train is a concave mirror. A real image on the light bulb or conjugate surface on the object side can be formed as an intermediate image on the optical path between the refractive optical system and the mirror train.

The first focus structure moves the lens groups of the refractive optical system along the normal line of the light bulb or the conjugate surface on the object side by different amounts for floating focusing of a projected image on the screen.

Moreover, the second focus structure moves the lens groups of the refractive optical system along the normal line of the light bulb or the conjugate surface on the object side by different amounts from those of the first focus structure. Thereby, it is possible to effectively correct blurs in the entire projected image due to a variation in the distance between the refractive optical system and the light bulb and a variation in the focal length of the refractive optical system.

The second focus structure cannot be operated by a user after the image display device is assembled into the exterior package. Thus, the two focus structures do not confuse the user when he operates the image display device.

Although the present invention has been described in terms of exemplary embodiments, it is not limited thereto. It should be appreciated that variations or modifications may be made in the embodiments described by persons skilled in the art without departing from the scope of the present invention as defined by the following claims.

What is claimed is:

1. A magnification optical system to form an enlarged image of an object, comprising:
    a refractive optical system including a plurality of lens groups; and
    a mirror train including a curved mirror, arranged in the following order from an object side;
    a first focus structure configured to move a part of the lens groups of the refractive optical system along a normal line of a conjugate surface on the object side while maintaining a distance between a conjugate-side lens surface of a lens of the refractive optical system closest to the object and the conjugate surface on the object side; and
    a second focus structure configured to change the distance between the conjugate-side lens surface of the lens of the refractive optical system closest to the object and the conjugate surface on the object side, wherein
    the second focus structure is fixed during operation of the first focus structure.

2. The magnification optical system according to claim 1, wherein
    the second focus structure is a protrusion mechanism to move an entirety of the refractive optical system along the normal line of the conjugate surface on the object side.

3. The magnification optical system according to claim 2, wherein
    the protrusion mechanism is comprised of a lens barrel to hold the refractive optical system and a screw mechanism, and the protrusion mechanism protrudes by a rotation of the screw mechanism.

4. A magnification optical system according to claim 1, wherein
    the second focus structure is a front focus mechanism to move one of the lens groups of the refractive optical system as farthest from a conjugate surface on a reduction side along the normal line of the conjugate surface on the reduction side.

5. The magnification optical system according to claim 1, further comprising
    a reflecting mirror between the refractive optical system and the mirror train to bend an optical path, held in a structure which is able to adjust a set position of the reflecting mirror.

6. The magnification optical system according to claim 5, wherein
    the structure is comprised of a holder for the reflecting mirror and one or more intervenient elements provided between the holder and the reflecting mirror.

7. The magnification optical system according to claim 5, wherein the curved mirror of the mirror train is a concave mirror to form a real image of the object as an intermediate image on an optical path between the refractive optical system and the mirror train.

8. The magnification optical system according to claim 6, wherein
the curved mirror of the mirror train is a concave mirror to form a real image of the object as an intermediate image on an optical path between the refractive optical system and the mirror train.

\* \* \* \* \*